March 9, 1954 H. L. BOWDITCH 2,671,710
RECORDING INSTRUMENT STRIP CHART MECHANISM
Filed Sept. 9, 1952 5 Sheets-Sheet 1
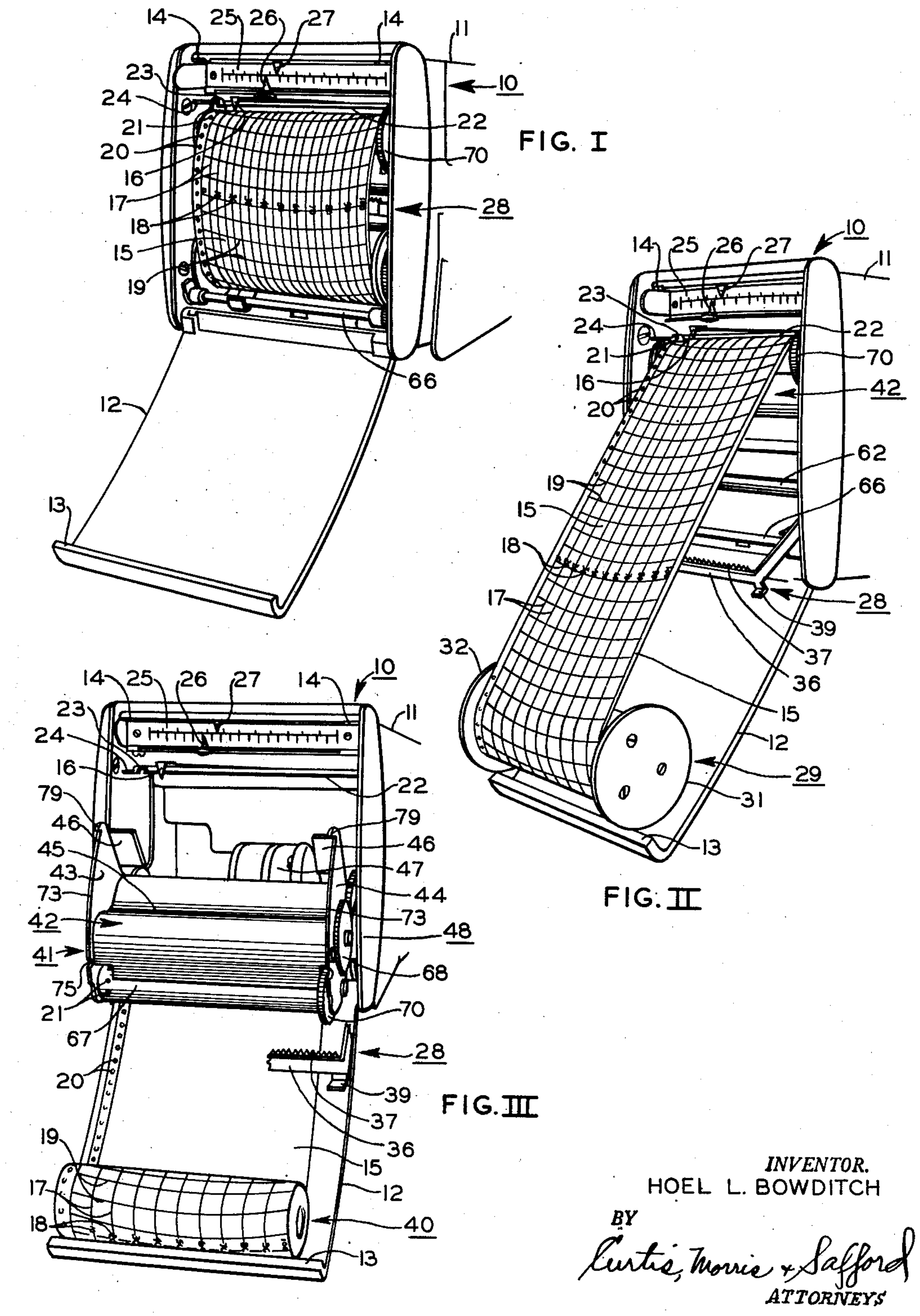
FIG. I, FIG. II, FIG. III
INVENTOR.
HOEL L. BOWDITCH
BY Curtis, Morris & Safford
ATTORNEYS March 9, 1954 H. L. BOWDITCH 2,671,710
RECORDING INSTRUMENT STRIP CHART MECHANISM
Filed Sept. 9, 1952 5 Sheets-Sheet 2
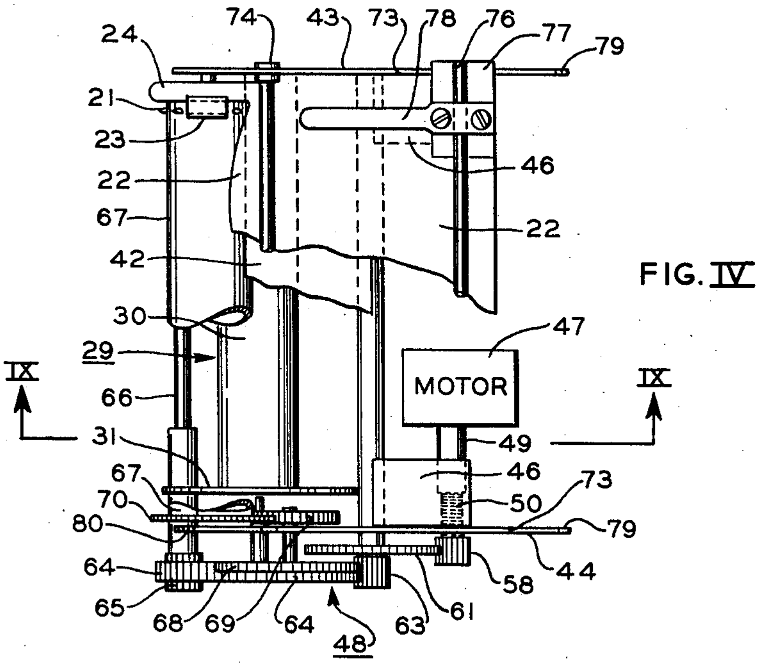
FIG. IV
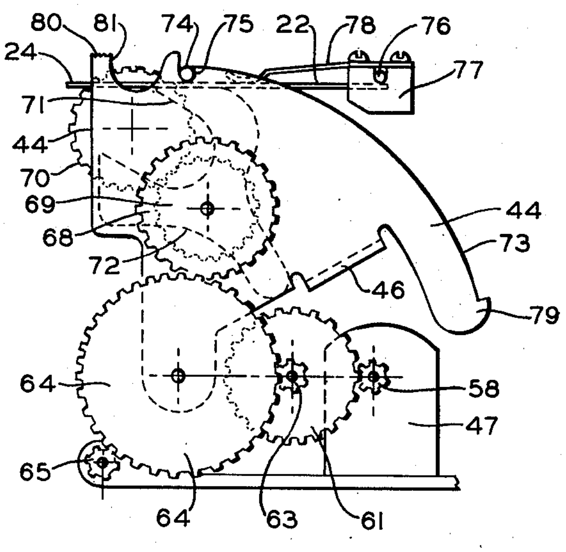
FIG. V
INVENTOR.
HOEL L. BOWDITCH
BY
Curtis, Morris & Safford
ATTORNEYS RECORDING INSTRUMENT STRIP CHART MECHANISM
Filed Sept. 9, 1952 5 Sheets-Sheet 3
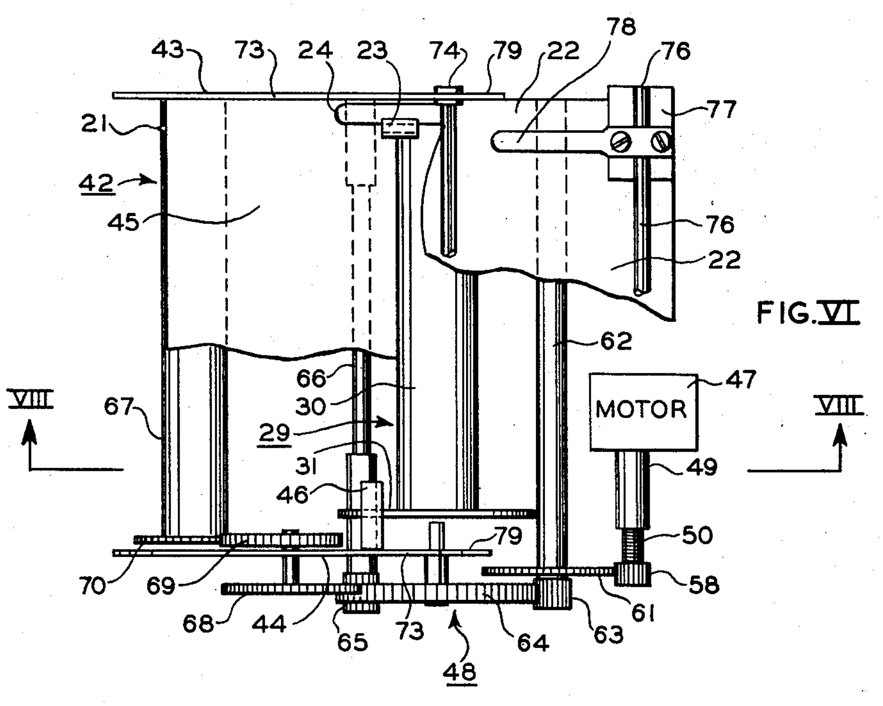
FIG. VI
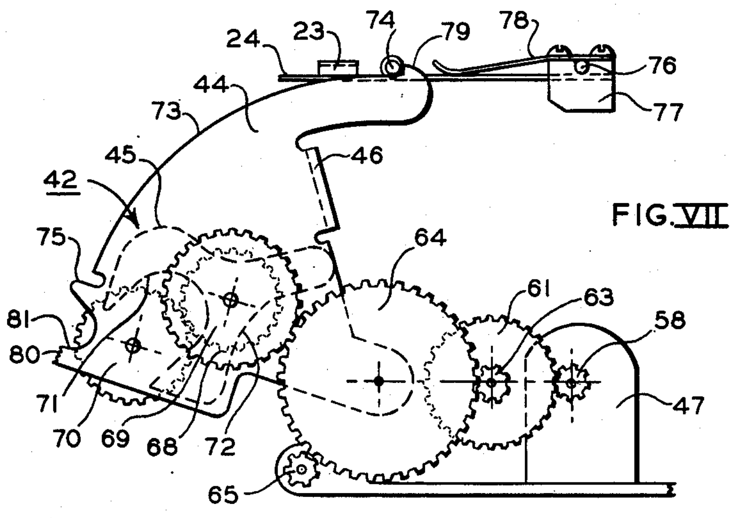
FIG. VII
*INVENTOR.*
HOEL L. BOWDITCH
*BY*
Curtis, Morris & Safford
*ATTORNEYS*

March 9, 1954 H. L. BOWDITCH 2,671,710
RECORDING INSTRUMENT STRIP CHART MECHANISM
Filed Sept. 9, 1952 5 Sheets-Sheet 4
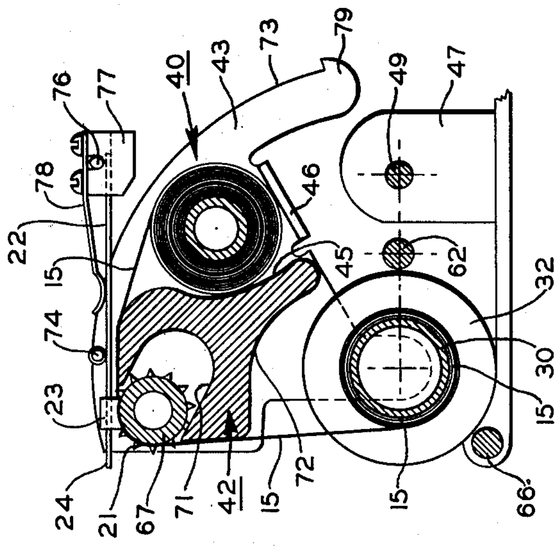
FIG. IX
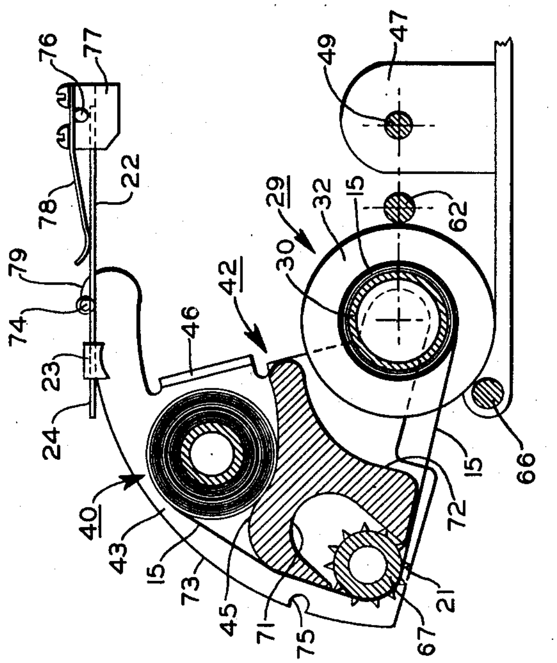
FIG. VIII
INVENTOR.
HOEL L. BOWDITCH
BY
Curtis, Morris & Safford
ATTORNEYS RECORDING INSTRUMENT STRIP CHART MECHANISM
Filed Sept. 9, 1952 5 Sheets-Sheet 5
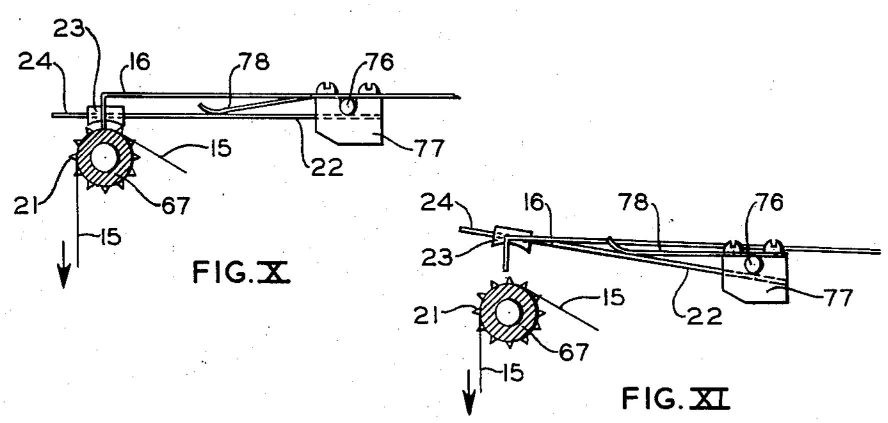
FIG. X, FIG. XI
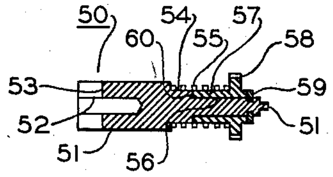
FIG. XII
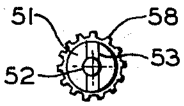
FIG. XIV
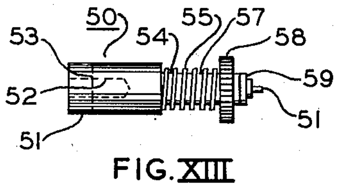
FIG. XIII
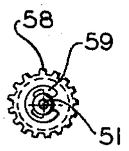
FIG. XV
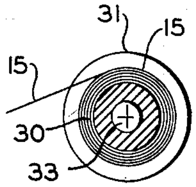
FIG. XVII
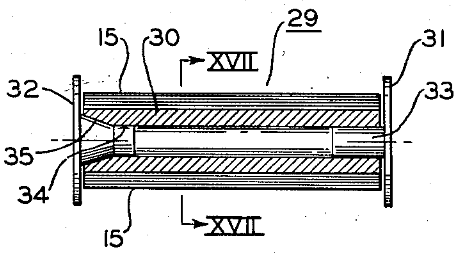
FIG. XVI
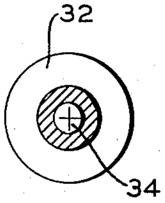
FIG. XVIII
INVENTOR.
HOEL L. BOWDITCH
BY
Curtis, Morris & Safford
ATTORNEYS Patented Mar. 9, 1954 2,671,710

UNITED STATES PATENT OFFICE 2,671,710

RECORDING INSTRUMENT STRIP CHART MECHANISM

Hoel L. Bowditch, Foxboro, Mass., assignor to The Foxboro Company, Foxboro, Mass., a corporation of Massachusetts Application September 9, 1952, Serial No. 308,679

9 Claims. (Cl. 346—24)

This invention relates to recording instruments wherein the value of a variable condition is automatically recorded on a moving chart by a pen which is driven over the surface of the chart in response to changes in the value of the variable condition.

In particular, this invention is concerned with such recording instruments wherein a "strip" chart is used, that is, a chart which is wound from one roll to another at a predetermined constant linear speed.

More specifically, this invention relates to structures and mechanisms for handling strip charts in such recording instruments.

In modern instrumentation, especially in the larger complex industrial installations, it has become necessary in many instances to use a large number of instruments located together at a single instrument station. Multi-instrument panels often are used in such installations and there is usually a minimum space on each panel in which to locate the various instruments. It has, therefore, become important that the instruments be as compact as possible, particularly recording instruments in which it is customary for the strip chart handling mechanisms generally to define the panel face area of the instruments. Further, the operation and servicing of a number of closely associated instruments requires that each one has easy accessibility to its various parts and that every instrument in the assembly be as rugged and dependable as possible to reduce the problems of servicing and maintaining the assembly.

It is an object of this invention to provide a novel recording instrument strip chart handling apparatus.

Another object of this invention is to provide a strip chart structure and mechanism which is compact, accessible, simple, and sturdy.

A further object of this invention is to provide strip chart apparatus with means for holding both a chart supply roll and a chart reroll spool bodily free in trough structures and, respectively, in frictional restraint and frictional drive relation in said instrument.

These and other objects of this invention will be in part pointed out and will be in part apparent from the text and claims here presented, and from the accompanying drawings, in which:

Figure I is a perspective view of the front portion of a strip chart recording instrument embodying this invention;

Figure II is a further showing of the structure of Figure I, in the same general view and with the strip chart reroll spool removed from the instrument;

Figure III is a further showing of the structure of Figures I and II, in the same general view, and with the strip chart supply roll removed from the instrument;

Figure IV is a plan view, generally showing the mechanism of the instrument of Figures I through III, with the mechanism in operating position and removed from the instrument;

Figure V is an elevation of the lower end of the mechanism as seen in Figure IV;

Figure VI is a plan view, generally showing the mechanism of the instrument of Figures I through III, with the mechanism in chart loading position and removed from the instrument.

Figure VII is an elevation of the lower end of the mechanism as seen in Figure VI;

Figure VIII is a vertical section as on line VIII—VIII in Figure VI, with certain structure omitted in the interest of clarity;

Figure IX is a vertical section as on line X—X in Figure IV, with certain structure omitted in the interests of clarity;

Figure X is a showing of a recorder pen and chart in engagement, as a part of a structure embodying this invention;

Figure XI is a showing of the structure of Figure X, with the pen lifted from the chart;

Figure XII is a central longitudinal section through the drive motor spring clutch, as a part of a structure embodying this invention;

Figure XIII is a side elevation of the spring clutch arrangement of Figure XII;

Figure XIV is an elevation of the drive motor end of the spring clutch arrangement of Figures XII and XIII;

Figure XV is an elevation of the spring end of the spring clutch arrangement of Figures XII through XIV;

Figure XVI is an illustration of a strip chart reroll spool as a part of this invention, with the central portion in vertical central section;

Figure XVII is a sectional view of the spool of Figure XVI, taken as on line XVII—XVII in Figure XVI; and Figure XVIII is an inner end elevation of the left end removable spool end disc as seen in Figure XVI.

Referring to Figure I, this invention is embodied in a strip chart recording instrument 10, the front portion only being shown, since it contains the strip chart handling structure and mechanism with which this invention is concerned. The instrument 10 has a housing 11 with an open front end which is coverable by a transparent plastic cover 12. The cover 12 is pivoted on a horizontal axis at the bottom of the instrument and is shown in its open position. To close the cover, it is simply lifted and snapped into closed position by engaging an inwardly extending cover lip 13 with resiliently mounted retaining lugs 14. In the open end of the housing 11 a strip chart 15 is mounted in loaded and operating position for movement from within the instrument adjacent the top thereof, past a recording pen 16, and then downward and again into the instrument to be rerolled. The chart is provided with a series of vertical lines 17 calibrated transversely with indicia 18 to cooperate with a line on the chart which is formed as the pen 16 is moved in response to changes in the value of a variable condition. Also, the chart carries transverse lines 19 which are arcuately formed to parallel the transverse movement of the pen 16. The pen's movement is arcuate since it is mounted on a fixed pivot, not shown, at the rear of the instrument. Along the left vertical edge of the chart 15, as seen in Figure I, a series of chart drive openings 20 is provided to cooperate with the chart drive pins 21 seen at the top and left of the chart in Figure I, extending through the chart openings 20.

Above the chart 15 and beneath the main body of the pen 16, a horizontally disposed plate 22 is shown. This plate is under resilient bias downward toward the chart in a manner to be explained later herein. At the left forward edge of the plate 22 a downwardly facing channel hood 23 is provided, integral with the plate 22, to overlie the chart drive pins 21 and to engage the chart to hold it down and to keep the drive pins 21 in the chart openings 20. Further, and again at the left forward edge of the plate 22, a finger lift projection 24 is provided, and this is also integral with the plate 22. The chart is released and the pen is lifted as the projection 24 is lifted. In Figure I, the plate 22 is shown in a partially lifted position as a means of more clearly showing the form of the hood 23.

Above the plate 22, a double, horizontal scale 25 is provided, with a control set point indicator 26 associated with the lower scale, and an indicator 27 associated with the upper scale. The indicator 27 is made responsive to some factor in relation to the variable condition, for example, valve position in a flow control arrangement.

A chart tear-off cutter 28 is located in retracted position behind and out of the way of the operation of the chart 15. This cutter and its mounting will be described in detail hereinafter in connection with the discussion of Figure II.

In the instrument shown, Figure I, it may be seen that the strip chart defines the greater part of the frontal area of the instrument and the instrument has been given substantial depth as a means of providing a relatively small frontal area in the instrument and to make the instrument suitable for multi-instrument panel arrangements.

Referring to Figure II, the instrument structure of Figure I is shown in a slightly different position and in a different condition. In Figure II, a chart reroll spool 29 is shown, with a portion of the chart thereon and with the spool 29 removed from its operative position in the instrument. Details of the spool are shown in Figures XVI, XVII, and XVIII. The spool comprises a main body 30 in the form of a sleeve, with the strip chart 15 rolled thereon. The spool ends 31 and 32 are disc wheels with studs 33 and 34, respectively, in friction fit, removable relation with the inner diameter of the main body 30. The stud 33 is a simple cylinder, but the stud 34 has a cylindrical outer end joined with the wheel 32 by a truncated cone with its largest base at the wheel 32. The main body 30 of the spool 29 has an inner, truncated cone formation 35 for friction fit cooperation with the conical form of the stud 34. With this arrangement, the wheel 32 may easily be removed to remove the rerolled chart, and yet the spool may be rotated by friction drive on the wheels 31 and 32.

The reroll spool 29 is moved to the location shown in Figure II either to remove the chart from the spool as described above, or to cut the chart off on the tear-off cutter 28, or both. The cutter 28 is shown herein its operative position. The cutter is in the form of a U bracket, with the base 36 of the U extending across the instrument with a serrated cutter blade 37 thereon which in this position extends transversely under the chart 15 and faces upward so that downward and transverse movement of the chart will cause it to be cut off on the cutter 28. The cutter is pivotally mounted in the instrument through pivot pins 38 located on the U legs at the mouth of the U. The U legs are somewhat resilient and in assembly are biased by their own resilience laterally outwardly against the side walls of the instrument. Thus the cutter 28 is pivoted on an axis transverse to the instrument, with the cutter blade 37 movable in and out of operative position, as shown by comparing the cutter positions of Figures I and II. At the right end of the cutter blade 37, a finger projection 39 is provided to facilitate the movement of the cutter 28 about its pivot axis. The resilient bias of the U legs provides a holding arrangement to maintain the cutter in any position of adjustment. It is not necessary to remove the reroll spool 29 to the location shown in Figure II in order to use the cutter 28. With the arrangement of Figure I, the chart may be manually drawn outward an amount sufficient to allow the cutter to be pivoted outward into operative position. This freedom to draw the chart outward is provided by a clutch arrangement discussed later herein in connection with Figures XII through XV.

In Figure III, the instrument structure of Figures I and II is again shown in a slightly different position and in a different condition. In Figure III a chart supply roll 40 is shown removed from its operative position in the instrument. In order to make this removal possible, a chart supply roll support unit 41 has been tilted forward. In this view, the unit 41 has been tilted forward well beyond the usual point necessary to remove the supply roll 40, in order to more clearly illustrate the general chart handling structure and mechanism. Reference is made to Figures IV through IX for further details.

Returning to Figure III, the tiltable supply roll unit 41 has a cross bar body 42 with end plates 43 and 44 thereon. Of particular importance is a trough structure formed by a concave surface 45 on the cross bar body 42 and inwardly extending projections 46 on the end plates 43 and 44. The trough extends transversely of the instrument and in operative assembly and position the trough contains the chart supply roll 40. It should be noted that the chart supply roll has no axial pivot or support, nor is there any provision in the trough structure to support or bodily restrain the chart supply roll on any axial pivot or support member. The chart supply roll simply is rested by its own weight in the trough structure. It is bodily free, and restrained only by the frictional restraint of its own weight as it rests in the trough structure. This arrangement allows the chart to be drawn from the supply roll easily, and yet not too freely. Further, it provides a very simple arrangement for assembly and disassembly of the chart supply roll 40 with respect to the instrument. The reroll spool 29, Figure II, is similarly mounted in a trough structure, as will be seen later herein.

Figure III shows a chart drive motor 47 and a portion of a gear train 48 through which the motor 47 drives the chart 15. A further point in connection with Figure III is that with the chart supply roll support unit 41 tilted forward, as shown, ready access through a substantial opening is provided to the interior of the instrument from the front, for adjustment of portions of the instrument beyond the chart handling structure and mechanism.

Figures IV through IX illustrates the main body of strip chart handling structure and mechanism of the instrument of Figures I through III, with this structure and mechanism removed from the instrument. Figures IV through VII are shown without the strip chart in order to more clearly show the chart handling structure and mechanism.

Figures IV and V are a plan view and an end elevation, respectively, of the chart handling apparatus, in the operative position as shown in Figure I. That is, the chart supply roll support unit 41, Figure III, is tilted back into operative position in the instrument.

The drive motor 47 has a drive shaft 49 extending therefrom, with a sleeve spring clutch unit 50, see Figures XII through XV, on the shaft 49. The clutch unit 50 has a main shaft body 51. At one end thereof, the left end in Figure XII, this clutch shaft has a central axial recess 52 and a transverse slot 53 for receiving cooperating assembly elements of the motor drive shaft 49. The other end of the clutch shaft 51 has a portion 54 of reduced diameter on which a sleeve clutch coil spring 55 is mounted. A second shaft portion 56 of further reduced diameter is a mounting for a gear sleeve 57, the outside diameter of which is flush with the clutch shaft reduced diameter 54. The clutch spring 55 extends over the gear sleeve 57. Beyond the clutch spring, a gear form 58 extends radially from the gear sleeve 57. A C washer 59 is mounted on the clutch shaft 51 as a means of holding the gear sleeve 57 on the clutch shaft in abutment with a shoulder 60. In the operation of this spring clutch arrangement, the gear 58 is free to move in one direction, for example, counter-clockwise, because the coil spring 55 is slightly unwound by such movement, and the gear sleeve 57 is freed of the clutch shaft 51.

In the other direction of gear movement, i. e., clockwise, the spring 55 is slightly wound and binds the clutch shaft 51 and the gear sleeve 57 solidly and securely together.

This clutch arrangement thus provides a positive gear drive in one direction. By putting a load on the gear 58 and rotating it counter-clockwise by means of the motor 47, a positive drive is applied to the gear train 48. However, when it is desirable to manually pull the strip chart forward, as mentioned in connection with Figure II and the tear-off cutter 28 shown therein, the clutch gear 58 may be pulled forward, i. e., counter-clockwise and turned freely with respect to the clutch shaft 51. Another reason for manually pulling the strip chart forward is to zero the chart with respect to the pen. This action is also made possible by the clutch unit 50.

Returning to Figures IV and V, the clutch gear 58 is meshed with a larger gear 61 to positively drive a roller shaft 62 which extends transversely of the instrument as a part of a trough structure for receiving the chart reroll spool, Figures II, and XVI through XVIII. The gear train is continued from a small gear 63 integral with the gear 61, through another larger gear 64 to a small gear 65 which positively drives a second roller shaft 66 as another part of the reroll spool trough structure. These roller shafts may be seen in Figure II. In Figure IV the reroll spool 29 is shown with its end disc wheel 31 resting on the roller shafts 62 and 66.

It should be noted here that the reroll spool 29 is not mounted or driven on any center or axis but simply rests on the roller shafts in bodily free, friction drive relation therewith. Rotation of the roller shafts causes rotation of the reroll spool and the consequent rolling up of the strip chart as it is used.

The gear train 48 has two branches, one of which has just been followed to the roller shaft gear 65. The other branch of the gear train leads from the gear 64 as common to both branches, to a positively driven chart drive roll 67 by way of gears 68, 69, and 70. The gear 70 may be seen in Figures I, II, and III, the chart drive roll 67 may be seen in Figures II and III, and the chart drive pins 21 of Figures I and II may be seen to be integral with the chart drive roll 67, particularly in Figures II and IV. The gear train 48 is arranged to drive the reroll spool 29 slightly faster than it drives the chart drive roll 67 as a means of taking up slack in the strip chart between the drive roll and the reroll spool. Since the reroll spool is not positively driven, this difference in speed is not damaging.

The tiltable chart supply roll support unit 42, shown in Figure III, is here shown in Figures IV and V, pivotally mounted on an axis coincident with the axis of rotation of the gear 64 which is common to both branches of the gear train 48. The pivots of the tiltable unit are located in the unit end plates 43 and 44. These plates are generally triangular in shape, with the pivot points at one corner of the triangles. As the tiltable unit is moved about its pivot mounting, the gear 68 rolls along the gear 64 without disengagement. Thus there is no problem of remeshing gears after tilting the unit to change or replace the chart supply roll. Otherwise the gears might become damaged, or the chart drive roll (67) position might be undesirably changed.

The tiltable unit cross bar body 42 provides, in addition to the concave trough supply roll surface 45, a drive roll receiving concave surface 71 and a reroll spool receiving concave surface 72. The end plates 43 and 44 have upper edge portions 73 which are curved on radii from the pivot points of the unit and which extend rearward of the general triangular configuration of the end plates. These are guide edges for a pin 74 which rides therealong as the whole unit is tilted. In the position of Figures IV and V the pin 74 lies in slot 75 transversely and radially extending with respect to the end plates 43 and 44. The pin 74 extends across the whole instrument and is secured to the plate 22 of Figures I through III. The plate 22 is secured to a second transverse pin 76 at the rear of the plate, and the pin 76 is pivotally mounted in a pair of blocks 77 which in turn are secured to the body of the instrument. The previously mentioned downward spring bias on the plate 22 is accomplished by flat springs 78 secured to the blocks 77 and extending forwardly to engage the top of the plate 22 and to urge the plate downwardly about its pivot pin 76. Referring back to the pin 74, this plate bias provides a resilient bias on the pin 74 to hold it down in the slots 75.

Also as previously mentioned in connection with Figure I, a hood 23 is secured to the plate 22 in the form of an inverted channel for holding the chart on the drive pins 21. The plate 22 also has a finger lift projection 24 thereon. The plate 22 may be lifted about its pivot pin 76 by the projection 24, and this action lifts the pin 74 from the slots 75 and thus frees the tiltable unit 41 so that it may be moved about its pivot mounting too, for example, the position shown in Figures VI and VII.

In the tiltable unit position of Figures VI and VII, the pin 74 is held against radial projections 79 at the rear ends of the end plate guide edges 73 by the weight of the tilted unit in combination with the downward bias on the pin 74. This position of the tiltable unit 41 is comparable to the position shown in Figure III, although the unit there is tilted forward beyond the projections 79. It may be noted in Figure VII that the gear 68 has rolled around the periphery of the gear 64 without becoming disengaged therefrom. As an aid in the manual movement of the tiltable unit 41 about its pivot mounting, the end plate 44, at its upper, forward edge, is provided with a finger grip arrangement in the form of a corrugated edge portion 80 and an adjacent slot 81.

Figures VIII and IX are taken generally as sections of Figures IV and VI, with the strip chart added, as a means of illustrating the relation of the strip chart to the structure and mechanism of Figures IV through VII.

Figure IX shows the apparatus in the operative position of Figures I, IV, and V. The chart supply roll 40 is located in the trough structure formed by the tilt unit cross bar 42 and the end plate projections 46. The chart is drawn from the supply roll over the cross bar 42 and over the drive roll 67 and thence downward to the chart reroll spool 29 which rests in the trough structure formed by the driven roller shafts 62 and 66.

Figure VIII shows the apparatus in the inoperative, or chart supply roll removal position of Figures III, VI, and VII.

Figures X and XI illustrate the relation between the chart drive roll 67, the pen 16, the biased plate 22, the channel hood 23, and the finger lift projection 24. In Figure X the pen 16 is in operative engagement with the chart 15 as it is drawn over the drive roll 67 and the hood 23 overlies the drive roll pins 21 to hold the chart thereon. In Figure XI the plate 22 has been lifted about its pivot mounting in the form of the pin 76 pivotally mounted in the block 77. Thus the pen has been lifted from the chart by the plate 22 and the hood 23 has been lifted from the drive pins 21 to release the chart so that it may be lifted from the drive pins 21 for adjustment or removal.

This invention, therefore provides a new and novel recording instrument strip chart handling apparatus in the form of structure and mechanism which is compact, accessible, simple, and sturdy.

In particular, the strip chart apparatus of this invention, provides an arrangement for receiving both a chart supply roll and a chart reroll spool in bodily free disposition in trough structures and, respectively, in frictional restraint and frictional drive relation in said instrument.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

1. In a recording instrument, strip chart mechanism comprising, in combination, a supply roll trough structure for receiving a bodily free chart supply roll in frictional restraint relation therewith, a chart drive roll, chart engaging means on said drive roll for positively engaging said chart to draw it from said supply roll, chart reroll means comprising a pair of roller shafts forming a reroll spool trough structure for supporting a bodily free chart reroll spool in frictional drive relation therewith, and driving means comprising a motor driven shaft with a coil spring sleeve clutch on said shaft and a branching gear train operable by said driven shaft through said clutch, with one of said branches providing a positive gear drive for said chart drive roll and the other of said branches providing a positive gear drive for at least one of said roller shafts.

2. In a recording instrument of the type wherein a strip chart is unwound from a supply roll and moved along a path to reroll spool, strip chart handling mechanism comprising, in combination, a supply roll trough structure for receiving a bodily free chart supply roll in frictional restraint relation therewith, a chart drive roll, chart engaging means on said drive roll for positively engaging said chart to draw it from said supply roll into said path, chart reroll means comprising a pair of roller shafts forming a reroll spool trough structure for supporting a bodily free chart reroll spool in frictional drive relation therewith, driving means comprising a motor driven shaft with a coil spring sleeve clutch on said shaft and a branching gear train operable by said driven shaft through said clutch, with one of said branches providing a positive gear drive for said chart drive roll and the other of said branches providing a positive gear drive for at least one of said roller shafts, and a chart tear-off blade unit having a cutter portion, said unit being pivotally mounted in said instrument for adjustment about an axis adjacent and parallel to said roller shafts and between a retracted position adjacent said path and a cutting position wherein said unit extends into said chart path with said cutter portion parallel with said path.

3. In a recording instrument of the type wherein a strip chart is unwound from a supply roll and moved along a path to a reroll spool, strip chart handling mechanism comprising, in combination, a strip chart handling unit for carrying a chart supply roll, a pivotal mounting arrangement in said instrument for supporting said unit in said instrument for movement of said unit about an axis parallel to the longitudinal axis of said supply roll as carried by said unit, whereby said unit may be pivoted to a position at which said supply roll may be readily inserted or removed from said instrument, said unit including a supply roll trough structure for receiving said supply roll in bodily free, frictional restraint relation therewith, a chart drive roll, and chart engaging means on said drive roll for positively engaging said chart to draw it from said supply roll into said path, chart reroll means comprising a pair of roller shafts forming a reroll spool trough structure for supporting a bodily free chart reroll spool in frictional drive relation therewith, driving means comprising a motor driven shaft with a coil spring sleeve clutch on said shaft and a branching gear train operable by said driven shaft through said clutch, with one of said branches providing a positive gear drive for said chart drive roll and the other of said branches providing a positive gear drive for at least one of said roller shafts and with a gear common to both of said branches having an axis of rotation in alignment with said pivotal mounting arrangement of said supply roll unit, whereby said unit may be pivoted without disengaging any of the gears of said gear train, and a chart tear-off blade unit having a cutter portion, said blade unit being pivotally mounted in said instrument for adjustment about an axis adjacent and parallel to said roller shafts and between a retracted position adjacent said path and a cutting position wherein said blade unit extends into said chart path with said cutter portion parallel with said path.

4. In a recording instrument, strip chart mechanism comprising, in combination, a unit for carrying a chart supply roll, a pivotal mounting arrangement in said instrument for supporting said unit in said instrument for movement of said unit about an axis parallel to the longitudinal axis of said supply roll as carried by said unit, said unit comprising a pair of generally triangular end pieces with the axis of said pivotal mounting arrangement extending between said end pieces and through opposite corner portions thereof, a central body in the form of a bar joining said end pieces, a supply roll trough structure in said unit formed by a curved face on said bar and projections from said end pieces for receiving said supply roll in bodily free frictional restraint relation therewith, a chart drive roll trough structure in said unit formed by a second curved face on said bar, a chart drive roll in said drive roll trough, and chart engaging means on said drive roll for positively engaging said chart to draw it from said supply roll, a chart reroll spool trough structure comprising a pair of roller shafts for supporting said reroll spool in frictional drive relation therewith, and driving means comprising a branching gear train with one of said branches providing a positive gear drive for said chart drive roll and the other of said branches providing a positive gear drive for at least one of said roller shafts and with a gear common to both of said branches having an axis of rotation in alignment with the axis of said pivotal mounting arrangement of said chart support unit, whereby said unit may be pivoted without disengaging any of the gears of said gear train.

5. In a recording instrument, strip chart mechanism comprising, in combination, a unit for carrying a chart supply roll, a pivotal mounting arrangement in said instrument for supporting said unit in said instrument for movement of said unit about a pivot axis parallel to the longitudinal axis of said supply roll as carried by said unit, a guide portion on said unit in a plane extending transversely of said pivot axis, a spring biased plate, a pin carried by said plate and engaging said guide portion for movement there along as said unit is moved about said pivot axis, limit stop configurations on said guide portion for receiving said pin to locate said supply roll unit in predetermined positions of rotation about said pivot axis, a supply roll trough structure in said unit for receiving said supply roll in bodily free frictional restraint relation therewith, a chart drive roll, chart engaging means on said drive roll for positively engaging said chart to draw it from said supply roll, chart reroll means comprising a pair of roller shafts forming a reroll spool trough structure for supporting a bodily free chart reroll spool in frictional drive relation therewith, and driving means comprising a branching gear train with one of said branches providing a positive gear drive for said chart drive roll and the other of said branches providing a positive gear drive for at least one of said roller shafts, and with a gear common to both of said branches having an axis of rotation in alignment with said pivot axis of said supply roll unit, whereby said unit may be pivoted without disengaging any of the gears of said gear train.

6. In a recording instrument, strip chart mechanism comprising, in combination, a unit for carrying a chart supply roll, a pivotal mounting arrangement in said instrument for supporting said unit in said instrument for movement of said unit about a pivot axis parallel to the longitudinal axis of said supply roll as carried by said unit, a guide portion on said unit in a plane extending transversely of said pivot axis, a spring biased plate, a pin carried by said plate and engaging said guide portion for movement there along as said unit is moved about said pivot axis, limit stop configurations on said guide portion for receiving said pin to locate said supply roll unit in predetermined positions of rotation about said pivot axis with at least one of said configurations being a slot extending transversely of said guide portion and radially with respect to said pivot axis for receiving said pin to secure said unit against pivotal movement, a finger lift projection on said plate for lifting said pin from said slot to free said unit for pivotal movement about said pivot axis, a supply roll trough structure in said unit for receiving said supply roll in bodily free frictional restraint relation therewith, a chart drive roll, chart engaging means on said drive roll for positively engaging said chart to draw it from said supply roll, chart reroll means comprising a pair of roller shafts forming a reroll spool trough structure for supporting a bodily free chart reroll spool in frictional drive relation therewith, and driving means comprising a branching gear train with one of said branches providing a positive gear drive for said chart drive roll and the other of said branches providing a positive gear drive for at least one of said roller shafts, and with a gear common to both of said branches having an axis of rotation in alignment with said pivot axis of said supply roll unit, whereby said unit may be pivoted without disengaging any of the gears of said gear train.

7. In a recording instrument, strip chart mechanism comprising, in combination, a unit for carrying a chart supply roll, a pivotal mounting arrangement in said instrument for supporting said unit in said instrument for movement of said unit about a pivot axis parallel to the longitudinal axis of said supply roll as carried by said unit, a guide portion on said unit in a plane extending transversely of said pivot axis, a spring biased plate, a pin carried by said plate and engaging said guide portion for movement therealong as said unit is moved about said pivot axis, limit stop configurations on said guide portion for receiving said pin to locate said supply roll unit in predetermined positions of rotation about said pivot axis, a hood carried by said plate for holding said chart against a portion of said mechanism, a supply roll trough structure in said unit for receiving said supply roll in bodily free frictional restraint relation therewith, a chart drive roll, chart engaging means on said drive roll for positively engaging said chart to draw it from said supply roll with said chart engaging means at least in part covered by said hood, chart reroll means comprising a pair of roller shafts forming a reroll spool trough structure for supporting a bodily free chart reroll spool in frictional drive relation therewith, and driving means comprising a branching gear train with one of said branches providing a positive gear drive for said chart drive roll and the other of said branches providing a positive gear drive for at least one of said roller shafts, and with a gear common to both of said branches having an axis of rotation in alignment with said pivot axis of said supply roll unit, whereby said unit may be pivoted without disengaging any of the gears of said gear train.

8. In a recording instrument, strip chart mechanism comprising, in combination, a unit for carrying a chart supply roll, a pivotal mounting arrangement in said instrument for supporting said unit in said instrument for movement of said unit about a pivot axis parallel to the longitudinal axis of said supply roll as carried by said unit, a guide portion on said unit in a plane extending transversely of said pivot axis, a spring biased plate, a pin carried by said plate and engaging said guide portion for movement therealong as said unit is moved about said pivot axis, limit stop configurations on said guide portion for receiving said pin to locate said supply roll unit in predetermined positions of rotation about said pivot axis, with at least one of said configurations being a slot extending transversely of said guide portion and radially with respect to said pivot axis for receiving said pin to secure said unit against pivoted movement, a hood carried by said plate for holding said chart against a portion of said mechanism, a finger lift projection on said plate for lifting said pin from said slot to free said unit for pivotal movement about said pivot axis and for lifting said hood to free said chart, a supply roll trough structure in said unit for receiving said supply roll in bodily free frictional restraint relation therewith, a chart drive roll, chart engaging means on said drive roll for positively engaging said chart to draw in from said supply roll with said chart engaging means at least in part covered by said hood, chart reroll means comprising a pair of roller shafts forming a reroll spool trough structure for supporting a bodily free chart reroll spool in frictional drive relation therewith, and driving means comprising a branching gear train with one of said branches providing a positive gear drive for said chart drive roll and the other of said branches providing a positive gear drive for at least one of said roller shafts, and with a gear common to both of said branches having an axis of rotation in alignment with said pivot axis of said supply roll unit, whereby said unit may be pivoted without disengaging any of the gears of said gear train.

9. In a recording instrument, strip chart mechanism comprising, in combination, a unit for carrying a chart supply roll, a pivot arrangement for said unit about an axis parallel to the longitudinal axis of said supply roll as carried by said unit, a guide portion on said unit in a plane extending transversely of said pivot axis, a spring biased plate, a recording pen overlying said plate and extending to adjacency with said unit for operative engagement with said chart, a pin carried by said plate and engaging said guide portion for movement therealong as said unit is moved about said pivot axis, limit stop configurations on said guide portion for receiving said pin to locate said supply roll unit in predetermined positions of rotation about said pivot axis with at least one of said configurations being a slot extending transversely of said guide portion and radially with respect to said pivot axis for receiving said pin to secure said unit against pivotal movement, a finger lift projection on said plate for lifting said pin from said slot to free said unit for pivotal movement about said pivot axis and for lifting said pen from operative engagement with said chart, a supply roll trough structure in said unit for receiving said supply roll in bodily free frictional restraint relation therewith, a chart drive roll, chart engaging means on said drive roll for positively engaging said chart to draw it from said supply roll, chart reroll means comprising a pair of roller shafts forming a reroll spool trough structure for supporting a bodily free chart reroll spool in frictional drive relation therewith, and driving means comprising a branching gear train with one of said branches providing a positive gear drive for said chart drive roll and the other of said branches providing a positive gear drive for at least one of said roller shafts, and with a gear common to both of said branches having an axis of rotation in alignment with said pivot of said supply roll unit, whereby said unit may be pivoted without disengaging any of the gears of said gear train.

HOEL L. BOWDITCH.

References Cited in the file of this patent

UNITED STATES PATENTS

| Number | Name | Date |
|---|---|---|
| 793,053 | Clark | June 27, 1905 |
| 997,075 | Menns | July 4, 1911 |
| 1,407,376 | Buschmeyer | Feb. 21, 1922 |
| 1,815,681 | Schellentrager | July 21, 1931 |
| 2,188,210 | Smith | Jan. 23, 1940 |
| 2,267,886 | Anderson | Dec. 30, 1941 |
| 2,575,131 | Salkin | Nov. 13, 1951 |
| 2,594,136 | Di Maggio, Jr. | Apr. 22, 1952 |